Aug. 4, 1925.
H. C. LORD
JOINT
1,548,048
Original Filed April 11, 1921    2 Sheets-Sheet 1
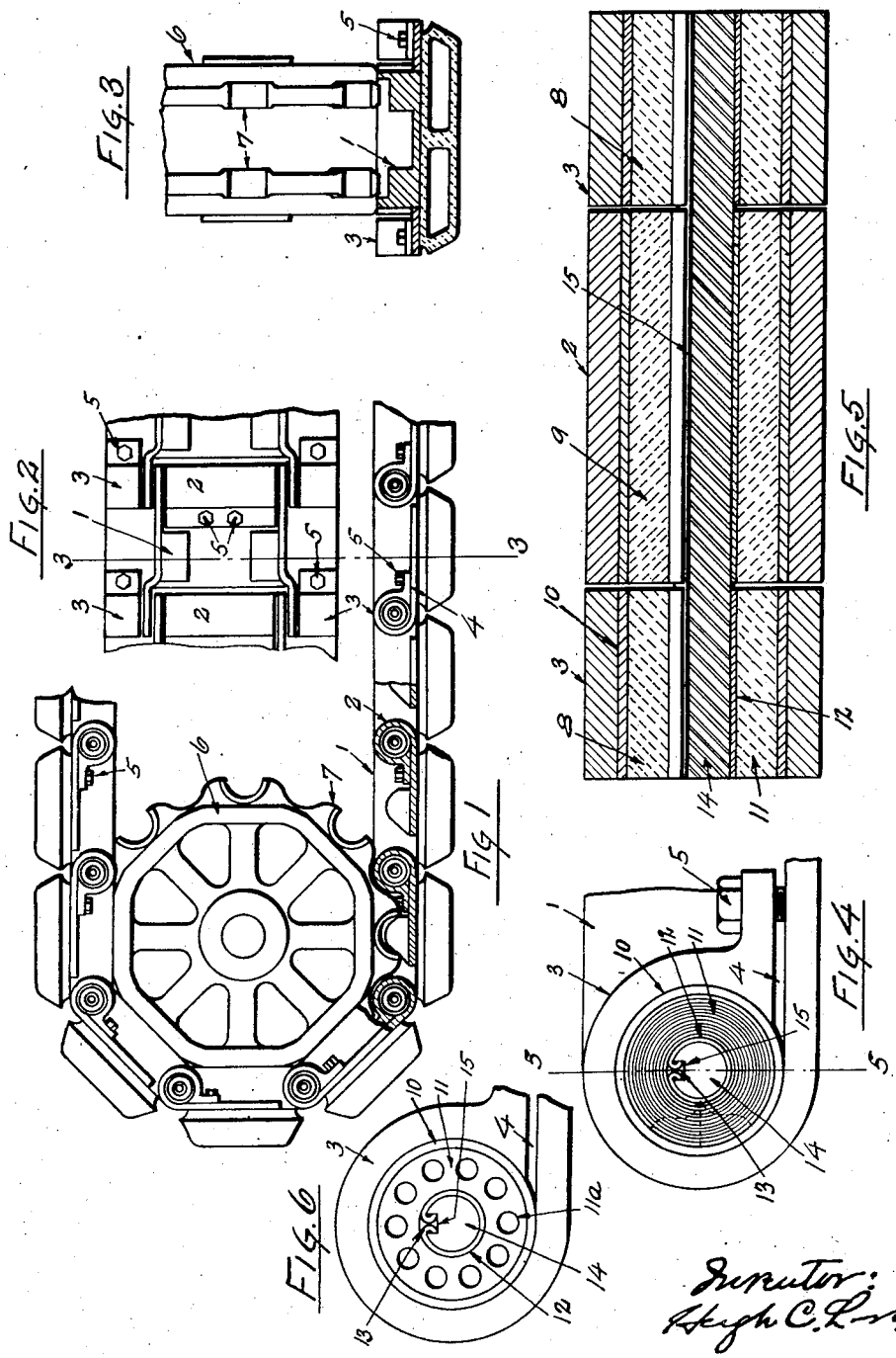

Aug. 4, 1925.
H. C. LORD
1,548,048
JOINT
Original Filed April 11, 1921   2 Sheets-Sheet 2
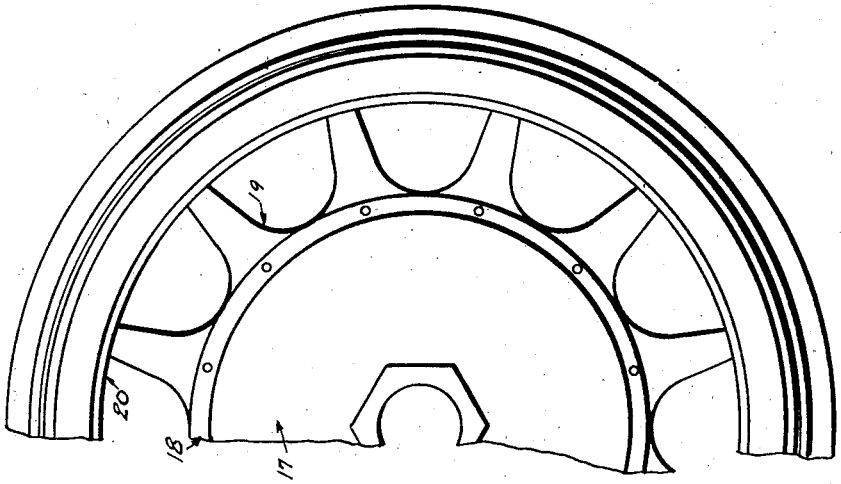
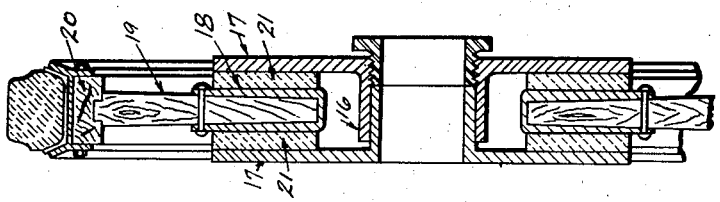
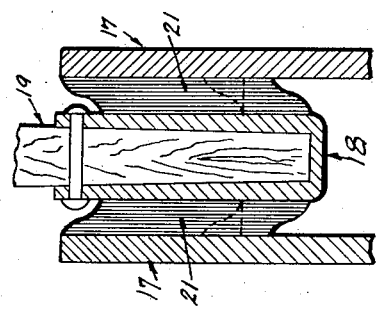
Inventor:
Hugh C. Lord Patented Aug. 4, 1925.

1,548,048

UNITED STATES PATENT OFFICE.

HUGH C. LORD, OF ERIE, PENNSYLVANIA.

JOINT.

Application filed April 11, 1921, Serial No. 460,380. Renewed July 1, 1925.

*To all whom it may concern:*

Be it known that I, HUGH C. LORD, a citizen of the United States, residing at Erie, in the county of Erie and State of Pennsylvania, have invented new and useful Improvements in Joints, of which the following is a specification.

The invention is designed to provide a frictionless joint. This is accomplished by interposing between the opposing surfaces of the joint members an intermediate member of rubber secured to the joint surfaces, the intermediate member of rubber through its distortion, or stretch permitting the relative movement of the joint members without disturbing the relation between the united surfaces of the rubber and the joint members. The rubber may be secured to a metal forming a joint member as it is vulcanized but if the rubber member is of uniform quality throughout the greater part of the distortion will take place immediately adjacent to the surface thus limiting the life of the rubber member and making its continued attachment to the metal less certain. Where the joint members are circular so that there is an outer shell and an inner shell with an intermediate portion of rubber this difficulty as to uniform quality of rubber is greater because the mass of rubber adjacent to the inner shell is acted upon by a very much larger mass of rubber at the outer circumference of the rubber member. As a consequence the relative movement of the metal members results in a short bending action of the rubber immediately adjacent to the attached surface and creates particular stress immediately at the surface of the inner shell or metal member.

With the present invention I obviate this difficulty by making the central part of the rubber weaker or less resisting than that part of the rubber adjacent to the edge surfaces so that the distortion is graduated and short bends obviated.

The joint is particularly advantageous in connection with chains or caterpillar tracks and is in its preferred form so illustrated.

With such joints it is possible to place a series of outer rotating elements in alinement about a single central member or pin and connect the outer elements through a rubber member with this central pin. Where this is done the distortion due to a given swinging movement of the joint is divided between the various walls of rubber and thus reduces very materially the distortion.

The invention also involves improvements in the details of construction.

The invention is illustrated in the accompanying drawings as follows:—

Fig. 1 shows a side elevation of a caterpillar track.

Fig. 2 a plan view of a joint.

Fig. 3 a section on the lines 3—3 in Figs. 1 and 2.

Fig. 4 an enlarged side view of one of the joints.

Fig. 5 a section on the line 5—5 in Fig. 4.

Fig. 6 an alternative construction of rubber member.

Fig. 7 a side elevation of a resilient wheel involving a rubber joint having the broad features of the invention.

Fig. 8 a vertical section of the wheel.

Fig. 9 an enlarged view of the joint with the elements moved relatively to each other.

1 marks a link of the chain, 2 a central knuckle at one end of the link, 3 knuckles at the outer edges of the opposite end of the link. The knuckles are split at 4 and screws 5 extend through the split portion forming the knuckles into split sleeves which may be contracted by the screws 5. A sprocket 6 having the teeth 7 is provided which engages the central knuckles in the usual manner especially the outer portions of those knuckles, the screws 5 at the center clearing the teeth 7.

Resilient or joint elements 8 are arranged in the knuckles 3 and similar joint elements 9 are arranged in the knuckles 2, the knuckles 2 being twice the length of the knuckles 8. Each of these elements has an outer shell of sheet metal 10, an intermediate rubber member 11 and an inner shell 12, the rubber being vulcanized to these shells. The edges of the inner shell are turned inwardly at 13 and with the extreme inner ends of the inturned portions bent apart as clearly shown in Fig. 4. A pin 14 extends through the inner shells of the elements 8 and 9, this pin having a key-way 15 of a width which forces the edges of the inturned portion 13 slightly together as the pin is driven to place. Thus there is a spring fit in this key-way preventing any working.

The shells 10 are clamped in the knuckles by means of the screws 5. In the operation of the joint when one knuckle swings relatively to the other the relative movement necessary to accomplish the swinging is taken up through the distortion, or stretch of the rubber. By making the two elements 8 equal to the central element 9 the opposing masses of rubber are thus equalized and consequently are equally stretched or strained so that the relative movement is divided.

Where rubber of uniform quality is used the distortion of the rubber hinges at its connection with the metal, or if a single layer of hard rubber is used the distortion of rubber hinges at the connection of the soft rubber with the hard rubber so that there is great stress at this point. To obviate this I build up the rubber joint by gradually varying the quality of rubber making it stiff or hard next the metal surface and becoming gradually softer to an intermediate point between the metal surfaces. In making up a cylindrical joint such as shown this may be readily accomplished by rolling on successive layers of rubber of varying qualities, hard rubber near the surface and comparatively soft rubber at intermediate portions. I prefer to have the layer of softest rubber somewhat nearer the outer periphery than the center in that the greater mass of rubber in the outer circumference must be entirely resisted by the lesser mass nearer the inner shell. Where the rubber is built up in the manner specified the bending action follows more or less the dotted lines indicated in Fig. 4, thus avoiding sharp hinge points which add special stress to the rubber. The central portion of the rubber may be weakened in other ways to balance the stress and to relieve the surfaces nearer the portions of metal as for instance as shown in Fig. 6. Here the rubber member 11 has perforations 11ª extending axially through it, thus reducing the mass of rubber resisting movement in the central portion of the rubber member and consequently increasing the movement of these portions of the rubber member over those next the metal shells, the mass of rubber between openings opposing the continuous mass of rubber nearer the shells bringing a more pronounced movement in this smaller mass. The rubber may also be softer at the center.

The spring key 15 formed by the ends 13 will ordinarily hold the pins 14 in place so that nuts or other securing means at the ends will be unnecessary.

In Figs. 7, 8 and 9 I have shown the joint as attached to a wheel. Here the hub member 16 is provided with the radial flanges 17. An annular channel 18 receives the spokes 19 and a rim 20 is secured to the spokes. Rubber members 21 are secured to the opposing surfaces of the flanges 17 and the annular channel 18. As the wheel is subjected to load there is a relative movement of the member 18 relatively to the flanges 17. The rubber discs 21 are secured to the surfaces of the members 17 and 18 preferably by vulcanizing and are built up with comparatively hard rubber next the surface and with this quality of rubber gradually becoming softer toward the center. In consequence a displacement of the member 18 relatively to the member 17 results in a distortion of the rubber giving it a shape approximating that shown in Fig. 9 and thus avoiding any sharp hinge points, or movement giving special stress to any one part of the rubber and particularly relieving this action adjacent to the surfaces which would tend to loosen the rubber from the metal.

What I claim as new is:—

1. In a joint, the combination of two rigid members having opposing surfaces, said members having relative movement in a direction moving one surface along the other; and in intermediate rubber member bridging the space between the surfaces and having its surfaces secured to the surfaces of the rigid members by a surface bond, said intermediate member permitting the movement of the rigid members by its distortion and varying in resistance with greater resistance adjacent to the surfaces and gradually decreasing in resistance toward the center.

2. In a joint, the combination of two cylindrical joint members one within the other; and an intermediate rubber member between said joint members and secured thereto by a surface bond, said rubber member offering a varying resistance greater next the joint members and having gradually less resistance toward the center of the wall of the intermediate rubber members.

3. In a joint, the combination of two cylindical joint members one within the other; and an intermediate rubber member between said joint members and secured thereto by a surface bond, said intermediate member having great risistance to distortion adjacent to the inner joint member and becoming gradually less toward the center of the wall of the intermediate rubber member.

4. In a joint, the combination of cylindrical joint members one within the other, the inner member having inwardly extending edges; and an intermediate rubber member vulcanized to the cylindrical joint members.

5. In a joint, the combination of cylindrical joint members one within the other, the inner member having its edges turned inwardly and the inner edges of the bends separated; and a rubber member between the joint members and secured thereto.

6. In a joint, the combination of two cylindrical joint members one within the other, the inner joint member having inwardly extending edges the inner ends of the inwardly extending edges being separated;

an intermediate member of rubber secured to the opposing surfaces of said joint members; and a pin having a key-way engaging the inturned edges, the key-way having a width springing the edges toward each other.

7. In a joint for chains, the combination of two links having knuckles in alinement; a joint formed with a central pin; and intermediate members of rubber, the outer periphery of the rubber being locked with the knuckle and the inner periphery of the rubber being locked with the pin.

8. In a joint for chains, the combination of two knuckles arranged in alinement, said knuckles being separated; outer and inner cylindrical metal shells and an intermediate portion of rubber vulcanized to said shells; and a pin extending through the inner shells and secured thereto and the outer shells being clamped in the knuckles.

9. In a joint for chains, the combination of two knuckles in alinement; a joint element for each knuckle having cylindrical shells one within the other, the inner shell having an inturned edge; an intermediate member of rubber secured to the opposing surfaces of the shells; and a pin having a key-way engaging the inturned edges of the inner shells.

10. In a joint for chains, the combination of two links, one link having two knuckles, the knuckles being arranged at the outer edges and the other link having a centrally located knuckle between the first mentioned knuckles and in alinement therewith, the central knuckle being twice the length of each of the outer knuckles; a central pin extending through the knuckles; and rubber members locked with the knuckles and with the pin, the mass of rubber locked with the pin and central knuckle equaling the mass of rubber in the two outer knuckles.

11. In a joint for chains, the combination of two knuckles in alinement; pins in said knuckles; and rubber members having their inner surfaces locked with the pins and their outer surfaces locked with the knuckles, the rubber having a greater resistance next to the pins and becoming gradually less resistant toward the center.

12. In a joint, the combination of cylindrical joint members, one within the other; and a rubber member secured to the opposing surfaces of the cylindrical joint members, said rubber member having openings at the center reducing the mass of rubber at the center opposing the mass of rubber adjacent to the metal.

13. In a joint, the combination of a central member; a plurality of outer cylindrical members surrounding the central member and movable rotatably with relation to each other; and rubber members locked with said outer members and with the central member.

14. In a joint, the combination of a central member; a plurality of outer cylindrical members surrounding the central member and movable rotatably with relation to each other; and rubber members locked with said outer members and with the central member by surface bonds.

15. In a joint, the combination of a central member; a plurality of outer cylindrical members surrounding the central member and movable rotatably with relation to each other; and rubber members locked with said outer members and with the central member, the rubber in the rubber members being proportioned, one to the other to offer an equal resistance to oppose a rotative movement of the outer members whereby the distortion of the rubber is equalized with such opposing rotative movement.

16. In a joint, the combination of a central member; a series of outer cylindrical members surrounding and rotating relatively to the central member; a plurality of said series being separated but locked to rotate together and having rotative movement relatively to another of said outer cylindrical members; and rubber members between the outer members and the central member, the rubber members being locked with said outer and inner members.

17. In a joint, the combination of a central member; a series of outer cylindrical members surrounding and rotating relatively to the central member; a plurality of said series being separated but locked to rotate together and having rotative movement relatively to another of said outer cylindrical members; and rubber members between the outer members and the central member, the rubber members being locked with said outer and inner members by surface bonds.

18. In a joint, the combination of a central member; a series of outer cylindrical members surrounding and rotating relatively to the central member; a plurality of said series being separated but locked to rotate together and having rotative movement relatively to another of said outer cylindrical members; and rubber members between the outer members and the central member, the rubber members being locked with said outer and inner members, the rubber members being proportioned to equalize the resistance to opposing rotative movement of the outer members relatively to each other whereby the distortion of the rubber members with a given rotative movement is equalized.

19. In a joint, the combination of an inner member; three outer cylindrical members arranged over the inner member the intermediate member being twice the length of the outer members at the ends; and rubber members between the inner member and said outer members, said rubber members being locked to said inner and outer members.

20. In a joint, the combination of an inner member; three outer cylindrical members arranged over the inner member, the intermediate member being twice the length of the outer members at the ends; and rubber members between the inner member and said outer members, said rubber members being locked to said inner and outer members by surface bonds.

In testimony whereof I have hereunto set my hand.

HUGH C. LORD.